United States Patent

Katsura

[11] Patent Number: 5,261,504
[45] Date of Patent: Nov. 16, 1993

[54] MOTORCYCLE FRAME CONSTRUCTION

[75] Inventor: Takehisa Katsura, Iwata, Japan

[73] Assignee: Yamaha Hatsudoki Kabushiki Kaisha, Iwata, Japan

[21] Appl. No.: 979,467

[22] Filed: Nov. 20, 1992

Related U.S. Application Data

[63] Continuation of Ser. No. 665,466, Mar. 6, 1991.

[30] Foreign Application Priority Data

Mar. 9, 1990 [JP] Japan .................................. 2-58822
Jan. 31, 1991 [JP] Japan .................................. 3-31990

[51] Int. Cl.⁵ .................... B62K 11/04; B62M 7/04
[52] U.S. Cl. ..................... 180/219; 180/227; 180/291
[58] Field of Search ............... 180/219, 227, 311, 312, 180/291; 280/281.1, 288.1

[56] References Cited

U.S. PATENT DOCUMENTS

| | | | |
|---|---|---|---|
| 4,427,087 | 1/1984 | Inoue et al. | 180/219 |
| 4,660,854 | 4/1987 | Suzuki et al. | 280/281.1 X |
| 4,673,053 | 6/1987 | Tanaka et al. | 180/227 |
| 4,781,264 | 11/1988 | Matsuzaki et al. | 280/281.1 X |
| 4,805,716 | 2/1989 | Tsunoda et al. | 180/219 |
| 5,054,571 | 10/1991 | Takasaka | 180/219 |

Primary Examiner—Margaret A. Focarino
Assistant Examiner—Kevin Hurley
Attorney, Agent, or Firm—Ernest A. Beutler

[57] ABSTRACT

Two embodiments of motorcycles having improved frame constructions that are comprised of a head pipe and a pair of downwardly and rearwardly extending main frame members. The frame is further reinforced against loads from the front wheel by means of a center main frame member that is affixed to the head pipe at a point below the pair of main frame members and extends rearwardly therefrom at a different angle from the pair of main frame members but which is affixed to the pair of main frame members by a reinforcing cross member.

37 Claims, 17 Drawing Sheets

5,261,504

MOTORCYCLE FRAME CONSTRUCTION

This is a ccontinuation of U.S. patent application Ser. No. 665,466, filed Mar. 6, 1991.

BACKGROUND OF THE INVENTION

This invention relates to a frame construction for a motorcycle and more particularly to an improved, lightweight, high strength frame.

The desirability of maintaining lightweight for motorcycles has well as a low center of gravity is well known. Of course, in addition to maintaining a lightweight the motorcycle and particularly its frame construction must be extremely strong so as to resist the loads encountered when operating a motorcycle. One type of frame construction which is receiving considerable attention is that of the "Delta Box" type. With this type of frame, a pair of box shaped fabricated main frame members extend downwardly and rearwardly in almost a straight line from the head pipe to a pivot point for the rear wheel suspension. This type of frame construction has many of the desirable advantages called for in frame constructions. However, certain types of motorcycle application, such as moto-crossing, place abnormally high loads on the frame, particularly from the front wheel.

It is, therefore a principal object to this invention to provide an improved lightweight,. high strength frame for a motorcycle.

It is further object to this invention to provide a motorcycle frame of the type known generally as a "Delta Box" frame wherein the frame is reinforced against loads encountered by the front wheel in application such as moto-crossing.

It is a further object to this invention to provide an improved, lightweight, compact and neat appearing frame construction for a motorcycle.

One way in which the frame construction can be reinforced is by providing a center main frame member which is affixed to the head pipe at its forward end and is affixed to the pair of main frame members at a point spaced therefrom by a cross member assemblage. However, previous constructions of this type have placed the center main frame member at the same angle as the pair of side main frame members and hence have not fully triangulated and strengthen the construction. In addition, the center main frame member has been attached to the head pipe previously a point above the side main frame members and thus results in a triangular configuration when viewed in transversed cross sections which does not permit maximum space utilization and also which provides an uncomfortable seating arrangement.

It is, therefore, a still further object to this invention to provide an improved frame assembly for a motorcycle having a center main frame member and a pair of side main frame members that has a good overall configuration and high strength due to triangulation of the construction.

SUMMARY OF THE INVENTION

This invention is adapted to be embodied in a frame construction for a motorcycle type of vehicle having a head pipe that is adapted to journal a front wheel for steering movement and a pair of main frame members that are affixed at their forward ends to the head pipe and which extend downwardly and rearwardly therefrom to a pivot point for a rear wheel suspension. A center main frame member is affixed to the head pipe and extends rearwardly therefrom at a different angle to the horizontal than the pair of main frame members. Cross members means affix the main frame members to each other rearwardly of the head pipe.

Another feature of the invention is also adapted to be embodied in a frame construction for a motorcycle type of vehicle having a head pipe, a pair of main frame members, and a center main frame member each affixed thereto. In accordance with this feature of the invention, the center main frame member is affixed to head pipe at a point below the attachment of the pair of main frame members thereto.

DETAILED DESCRIPTION OF THE PREFERRED EMBODIMENTS OF THE INVENTION

Figure 1:
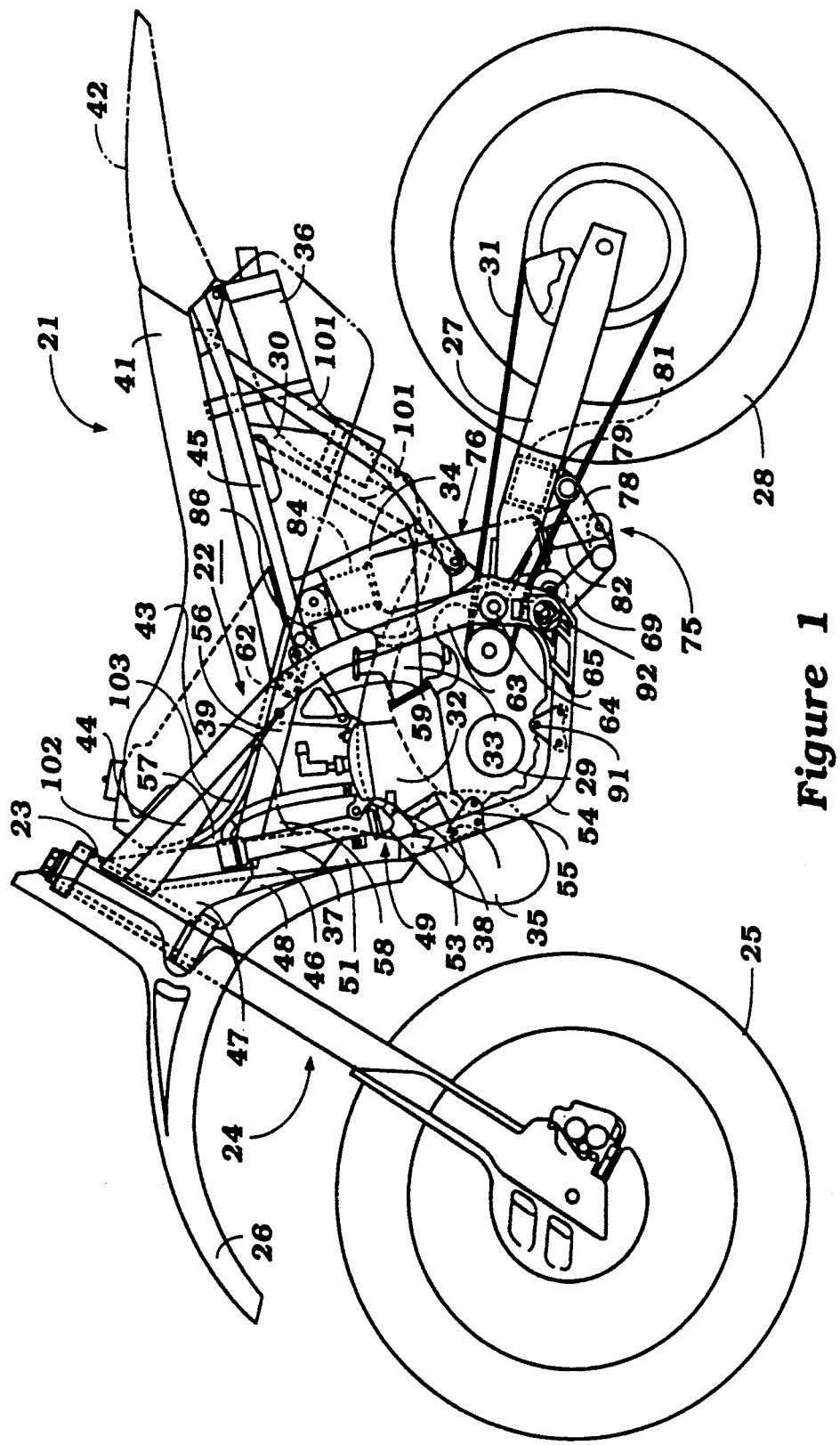
FIG. 1 is a side elevation view of a motorcycle having a frame constructed in accordance with an embodiment of the invention.
Figure 2:
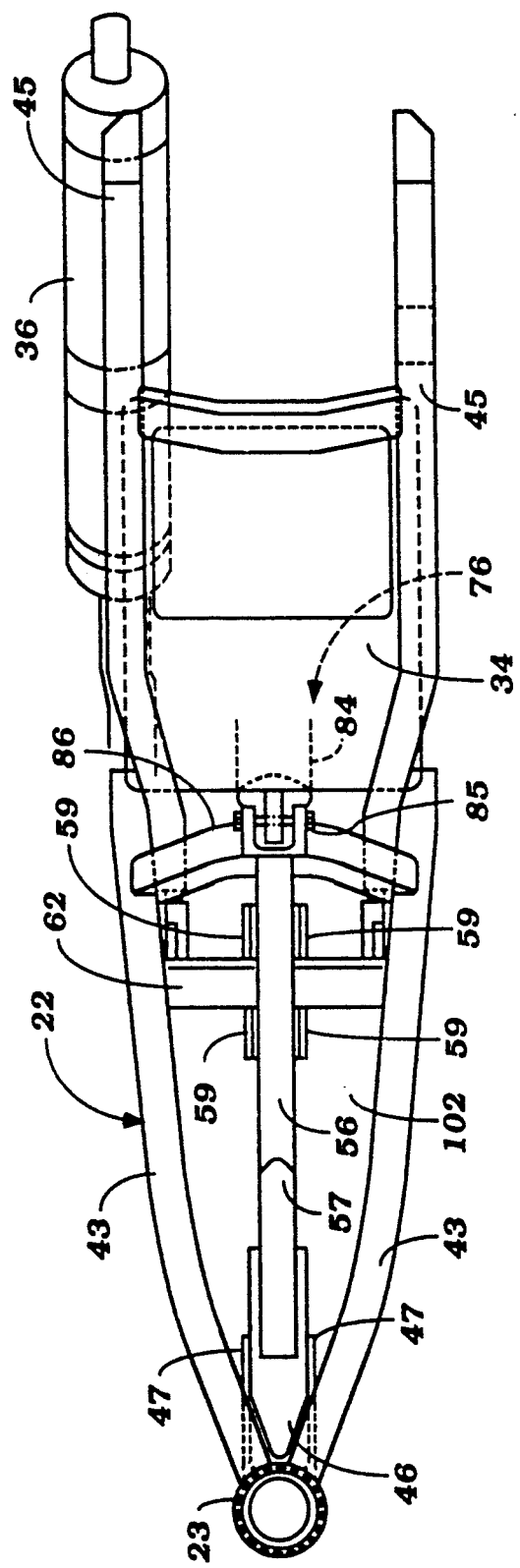
FIG. 2 is a top plan view showing primarily the frame of the motorcycle and certain components associated therewith.
Figure 3:
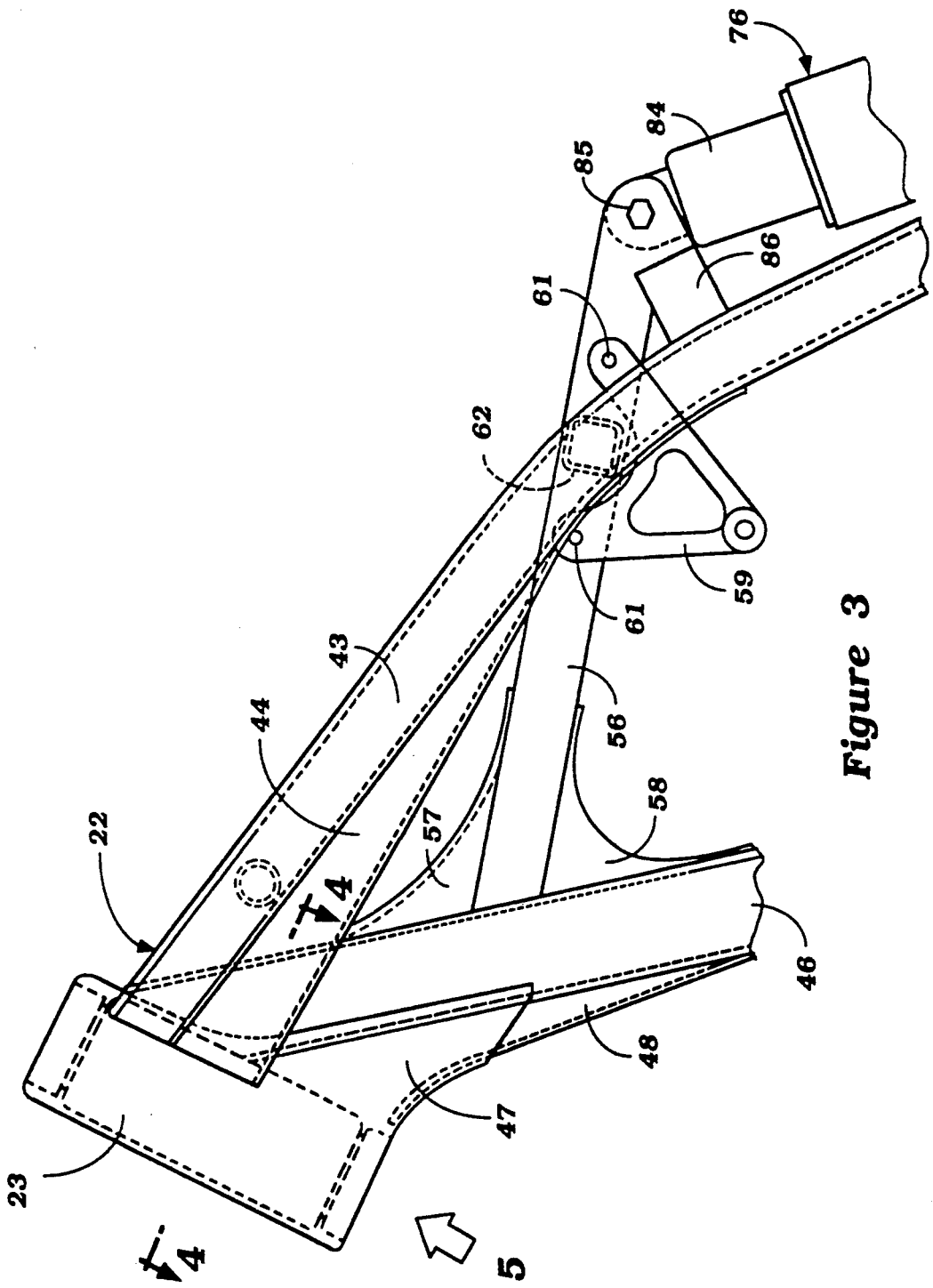
FIG. 3 is an enlarged side elevational view showing the to the head pipe.
Figure 4:
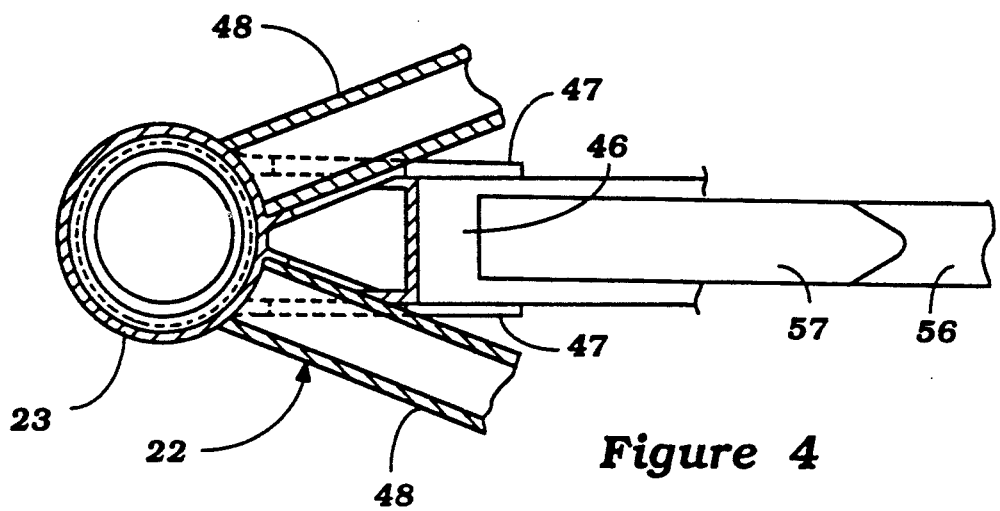
FIG. 4 is a cross sectional view taken along the line 4—4 of FIG. 3.
Figure 5:
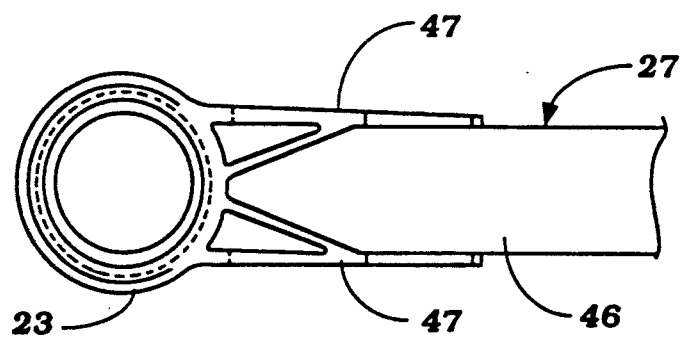
FIG. 5 is a bottom plan view of the frame taken generally in the direction of the arrow 5 in FIG. 3.
Figure 6:
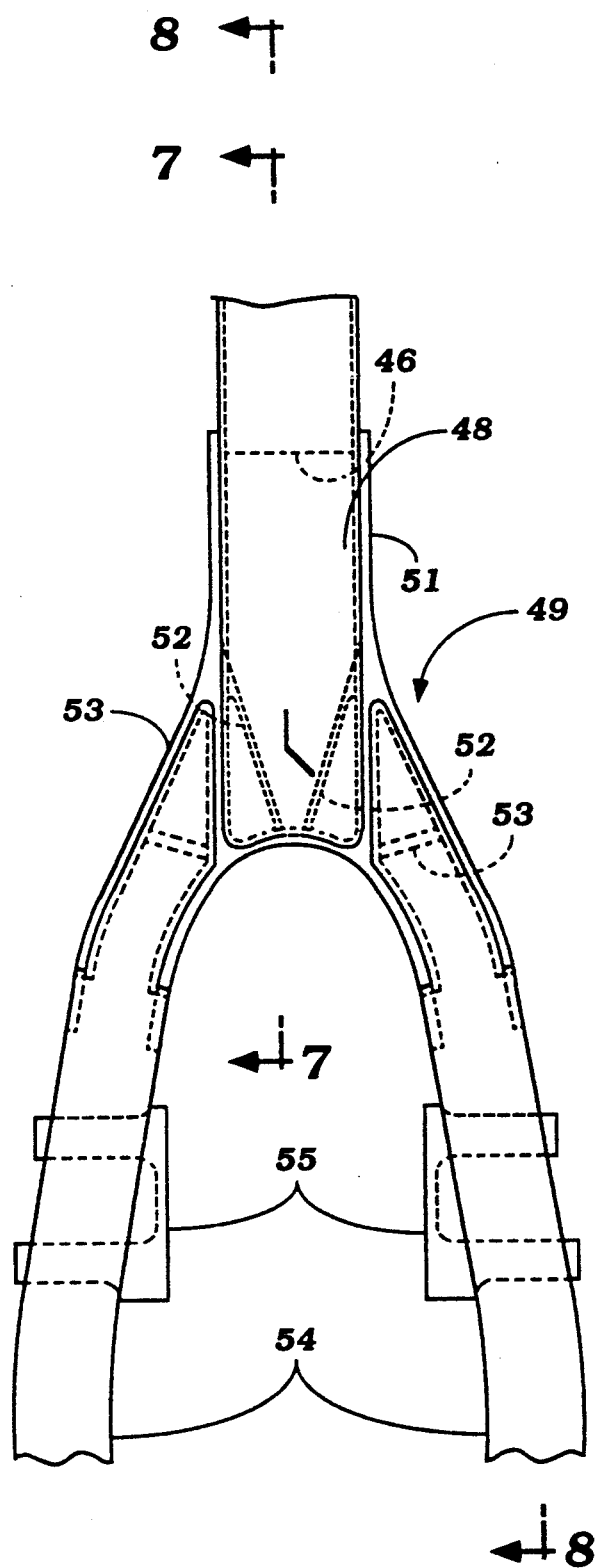
FIG. 6 is a front elevational view of the frame and shows primarily the lower portion thereof.
Figure 7:
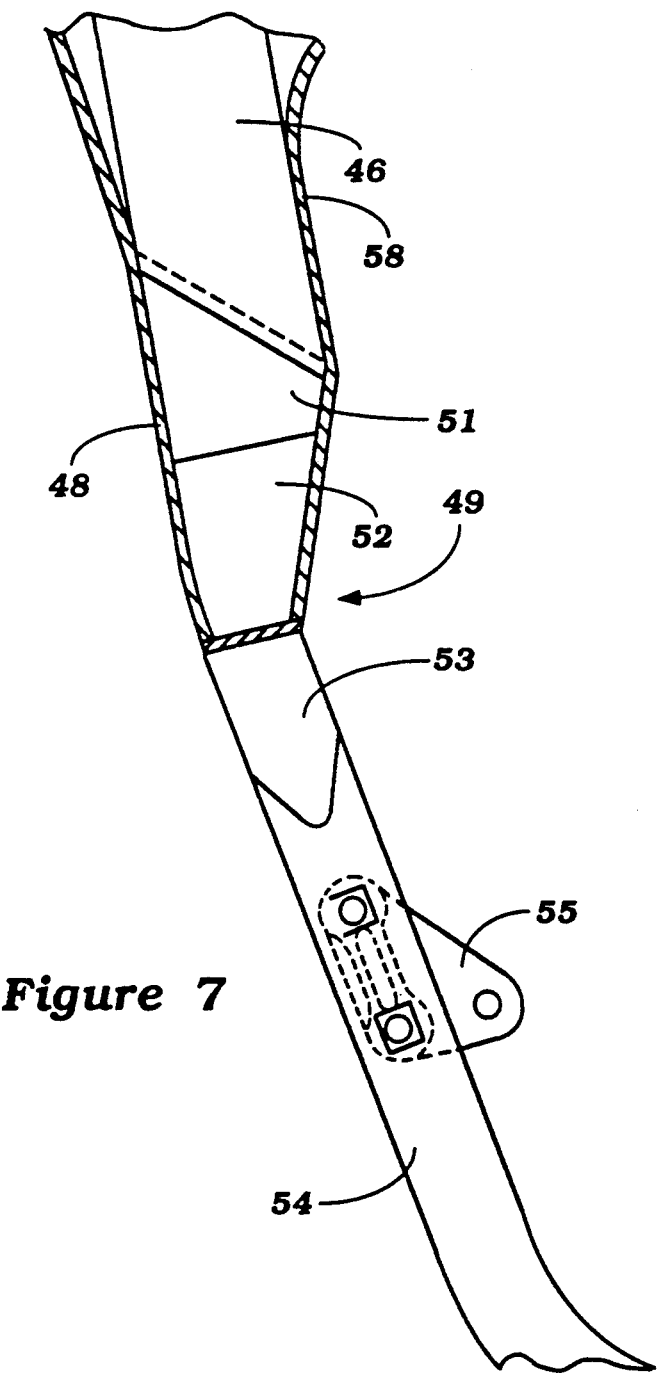
FIG. 7 is a cross sectional view taken along the line 7—7 of FIG. 6.
Figure 8:
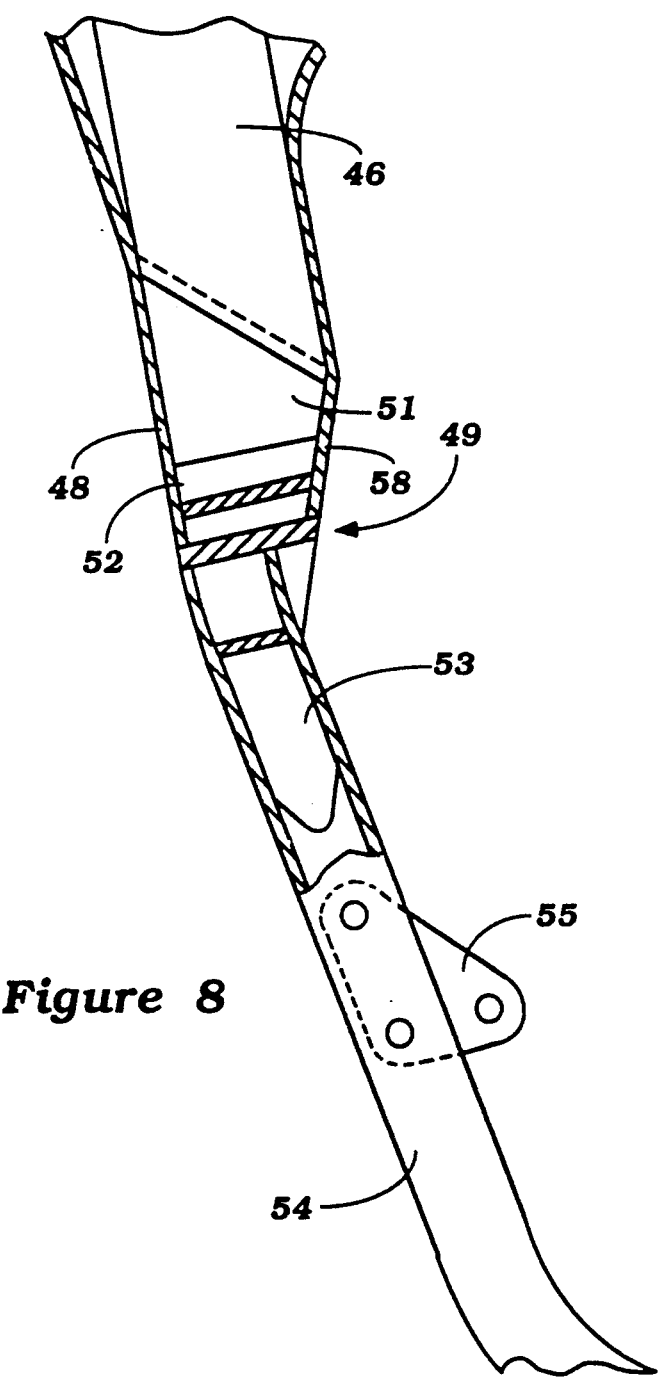
FIG. 8 is a cross sectional view taken along the line 8—8 of FIG. 6.
Figure 9:
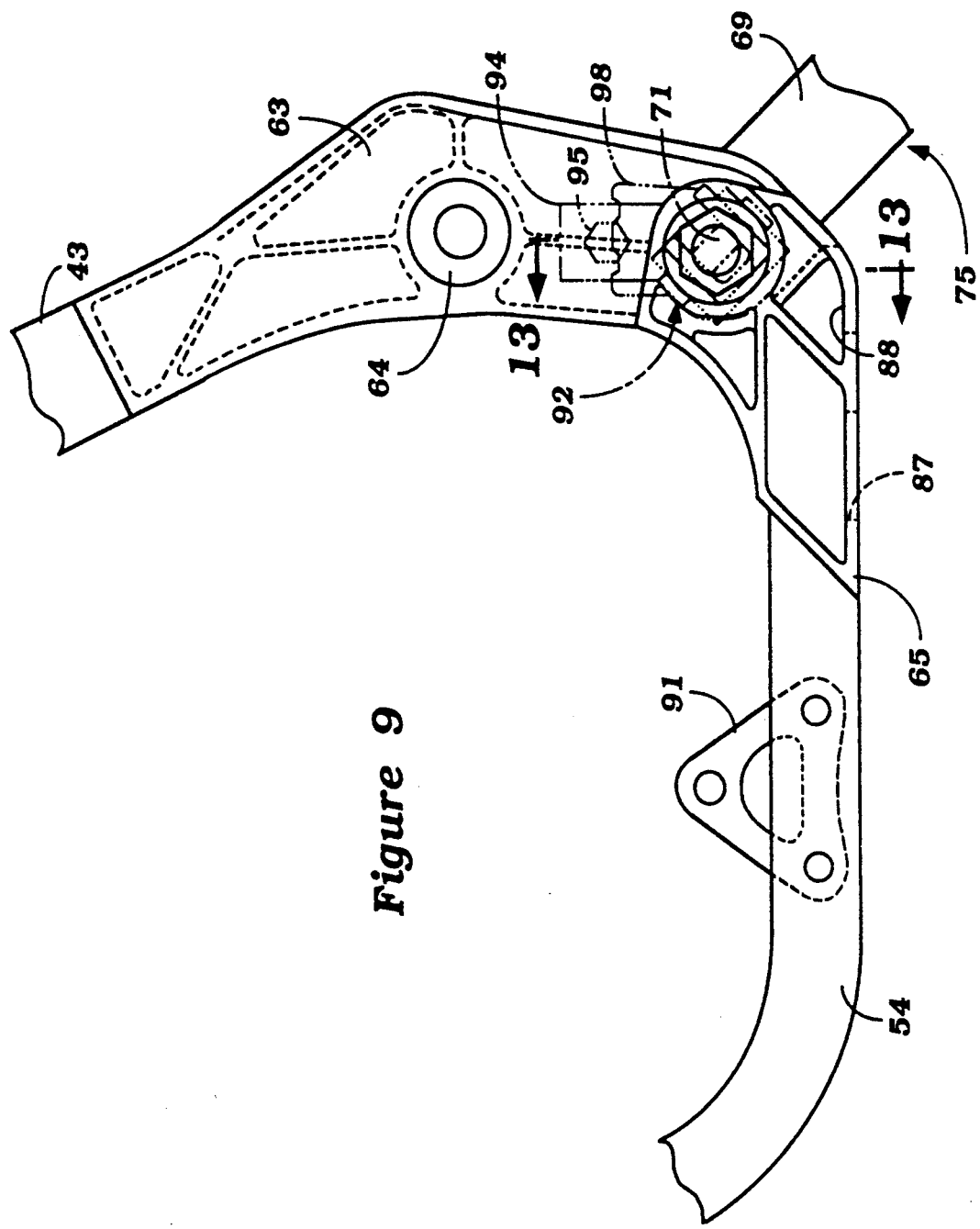
FIG. 9 is a side elevational view showing the lower portion of the frame assembly in the area of the pivot for the rear wheel suspension.
Figure 10:
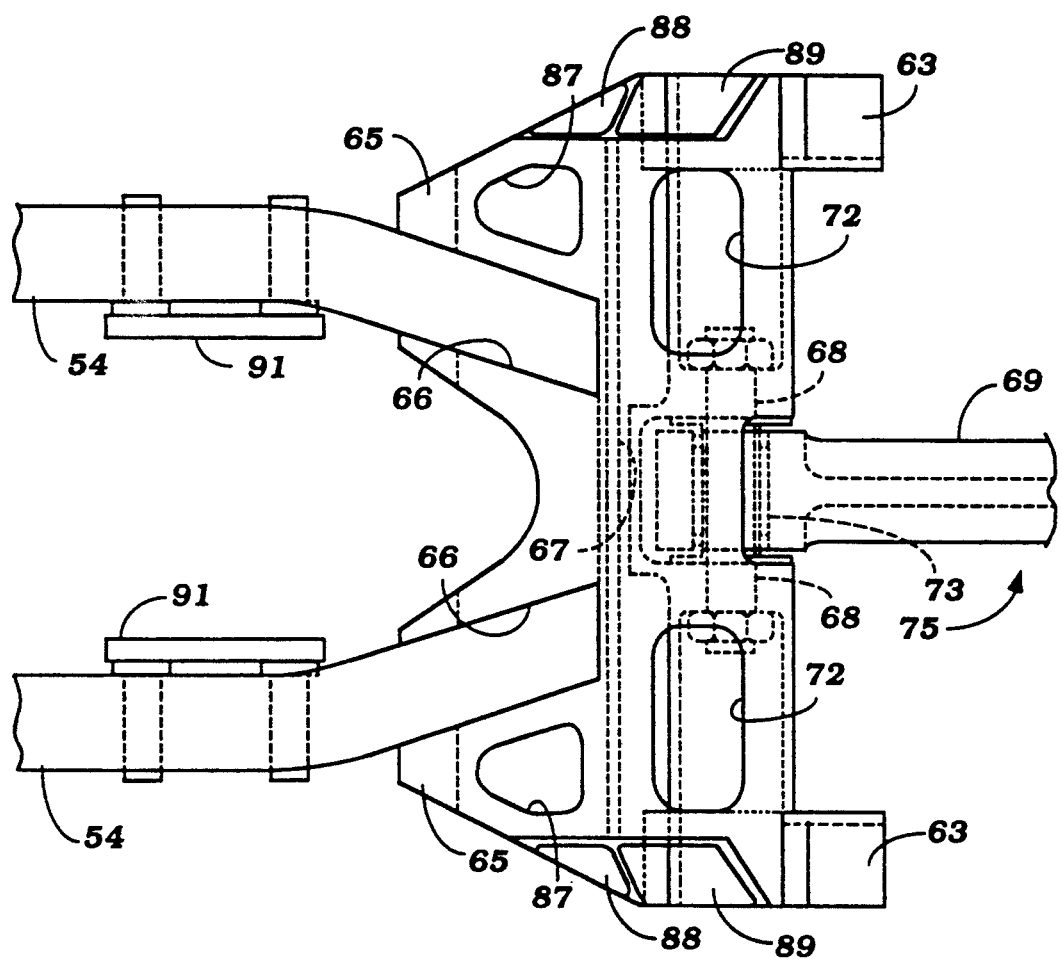
FIG. 10 is a top plan view of the area of the frame shown in FIG. 9.
Figure 11:
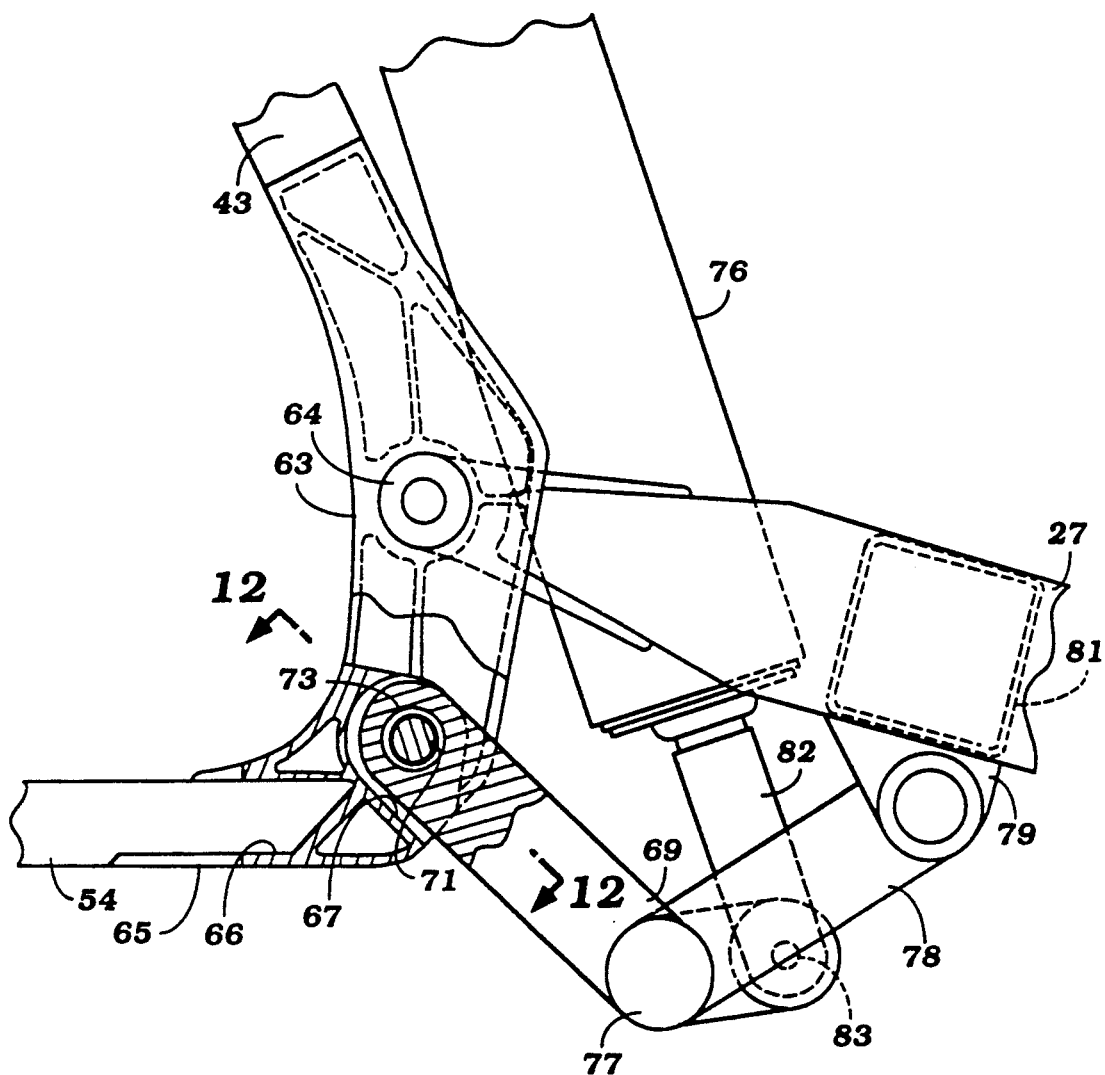
FIG. 11 is a further side elevational view, in part similar to FIG. 9, showing more of the rear wheel suspension mechanism and with a portion broken away to show the pivot point for the rear wheel suspension.

Referring now in detail to the drawings and initially primarily to FIG. 1, a motorcycle constructed in accordance with a first embodiment of the invention is identified generally by the reference numeral 21. The motorcycle 21 includes a frame, indicated generally by the reference numeral 22 and constructed in accordance with an embodiment of the invention. Frame 22 includes a head pipe 23 that journals a front fork assembly 24 for steering movement about a generally vertically upright steering axis which is inclined somewhat toward the rear. A front wheel 25 is suspended at the lower end of the front fork 24 in a known manner. A front fender 26 is also carried by the front fork 24 and overlies the front wheel 25.

A trailing arm 27, which is pivotally supported on the frame assembly 22 in a manner to be described, carries a rear wheel 28. The rear wheel 28 is driven from an internal combustion engine 29 in a manner to be described and which contains a change speed transmission in its crankshaft for driving the rear wheel 28 through a chain 31 in a known manner.

Although the engine 29 may be of any type, it is, in the illustrated embodiment, being depicted as the reciprocating water cooled type having a cylinder 32 that is generally disposed in a upright condition and which is supplied with a fuel/air charge by a rear mounted carburetor 33 that draws air from an air inlet device and air cleaner 34. The exhaust gases exit the engine 29 through an exhaust pipe 35 that extends forwardly and wraps around the side of the engine 29. The exhaust pipe discharges into a muffler 36 that is mounted at the rear portion of the frame assembly 22 on one side of the motorcycle for discharge to the atmosphere.

In conjunction with the liquid cooling system for the engine 29, there is provided a pair of radiators 37 that are mounted forwardly on the frame and which circulates water through the cooling jacket of the engine 29 through supply and return conduits 38 and 39.

A seat 41 is supported on the frame assembly and is designed to accommodate a single rider. Rearwardly of the seat 41, a fender, shown in phantom and identified by the reference numeral 42, overlies the rear wheel 28.

The construction of the motorcycle as thus far described may be considered to be generally conventional, except for the frame assembly, which will now be described by particular reference to the remaining figures.

Referring now to FIGS. 2 through 5 in addition to FIG. 1, the frame assembly 22, as already noted, includes the head pipe 23. The frame assembly 22 is preferably formed from a series of fabricated members which are formed from a lightweight material such as aluminum alloy and which are secured to each other, as by welding. The head pipe 23 has affixed to it at opposite sides thereof, a pair of main frame members 43 which have a box like configuration and which are affixed to the upper portion of the head pipe 23, as by welding. Triangular reinforcing sections 44 are affixed to the lower portion of the main frame members 43 and, in effect, form portions thereof to provide extremely high rigidity. The main frame members 43 extend generally rearwardly and downwardly toward a pivot point, to be described, for the trailing arm 26. As may be best seen in FIG. 2, the main frame members 43 diverge from the head pipe 23 and then turn and extend generally in a longitudinal direction along the frame 22 so as to afford a convenient riding position for a rider seated on the seat 41. A pair of seat rails 45 are affixed to the main frame members 43 toward their rear ends and extend in a somewhat upward direction rearwardly so as to support the seat 41 and rear fender 42.

A down tube assembly comprised of a first, generally box shaped member 46 is affixed to the head pipe 23 between the main frame members 43 and by means including a bifurcated section 47 of the head pipe 23 which extends rearwardly and downwardly. Down tube 46 further includes a reinforcing assembly 48 which extends downwardly to form a box like section 49 that is reinforced by internal plates 51 and 52 and which has a further portion 53 that receives the upper ends of down tube extensions 54. These down tube extensions 54 extend downwardly and then bend rearwardly beneath the engine 29. A pair of transversely spaced apart engine mounts 55 are affixed to the upper ends of the down tube extensions 54 and mount the top forward portion of the engine 29.

In order to add to the rigidity of the frame 22 and particularly to absorb forces exerted through the front wheel 25, there is provided a center main frame member 56 which is affixed to the head pipe assembly 23 by means of upper and lower gusset assemblies 57 and 58 which are, generally, affixed to the upper portion of the down tube 46. As a result, the center main frame member 56 is affixed to the lower portion of the head pipe assembly 23 while the outer side main frame members 43 are affixed to the upper end thereof. Also, it should be noted that the center main frame member 56 extends generally horizontally while the side main frame members 43 extends generally in a rearward and downward direction. Hence, this provides a triangulation which adds to the strength of the frame assembly 22.

A further engine mount 59 is affixed to the main frame member 56 rearwardly of the head pipe 23 and provides further support for the engine 29. The engine mounting bracket 59 is affixed t the center main frame member 56 by means of a pair of spaced bolt assembly 61 and a reinforcing cross member 62 extends outwardly from the opposite sides of the frame members 43 between the bolt assemblies 61 so as to provide further rigidity.

Turning now primarily to FIGS. 9 through 14 in addition to FIG. 1, it will be seen that the rear ends of the main frame members 43 and of the down tubes 54 are affixed to a rear suspension supporting member 63 which may be formed as a weldment or casting. The rear suspension supporting member 63 carries a pivot pin 64 which forms the journal for the forward end of the trailing arm 27. The member 63 also includes an aluminum alloy extrusion 65 that defines a pair of socket openings 66 that receive the rear ends of the down tubes 54 and to which they are affixed as by welding. This construction may be best seen in FIGS. 9 through 11, 12 and 14. As may be seen in FIG. 12, the rear ends of the down tubes 54 are bent inwardly toward a longitudinally extending center plane of the motorcycle 21 along the lines L.

The extrusion 65 is provided with a central recess 67 defined by a pair of spaced apart walls 68 into which one end of a suspension link 69 extends. The link 69 is pivotally supported by means of a pivot bolt 71 that is accessible through openings 72 formed transversely in the extrusion 65. The pivot bolt 7 carries an anti-friction bearing 73, the ends of which are closed by seals 74 for journaling the suspension link 69. The suspension link 69 comprises a portion of a linkage system, indicated generally by the reference numeral 75 for loading a suspension element, indicated generally by the reference numeral 76 for controlling the movement of the trailing arm 27 and rear wheel 28.

The opposite end of the link 69 is connected by means of a pivot pin 77 to the forward end of a second link 78.

The second link 78 is pivotally supported on a bracket 79 that is affixed to a cross member 81 of the trailing arm 27. A piston rod 82 of the suspension element 76 is connected by means of a pivot pin 83 to an extension of the linkage system for loading the suspension element 76 upon suspension travel. The upper end of the suspension element 76 (FIG. 3) carries a mounting trunion 84 that is connected by means of a pivot bolt 85 to an extension of the center main frame member 56 adjacent a cross member 86 that connects the center main frame member 56 with the side main frame members 43 for added rigidity.

The extrusion 65 is provided with a plurality of lightening holes such as vertically extending holes 87 and end recesses 88 and 89 so as to decrease the overall weight of the extrusion 65 and frame 22. Adjacent the extrusion 65, there is provided a further pair of engine mounting brackets 91 that are affixed to the rear ends of the down tubes 54 adjacent the extrusion 65. The engine unit 29 is mounted on these mounting brackets 91 in a suitable manner.

Figure 12:
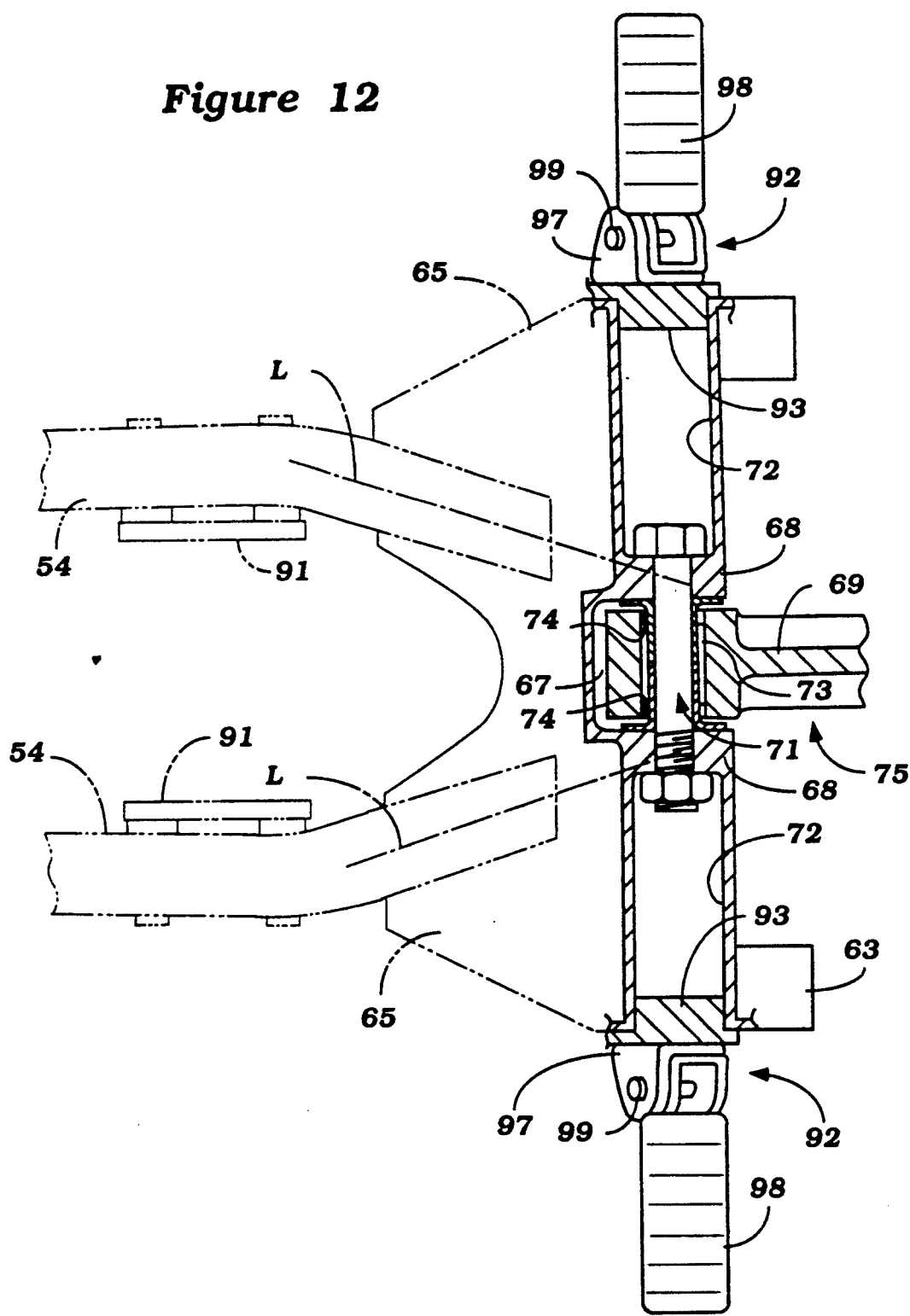
FIG. 12 is a cross sectional view taken generally along the line 12—12 of FIG. 11.
Figure 13:
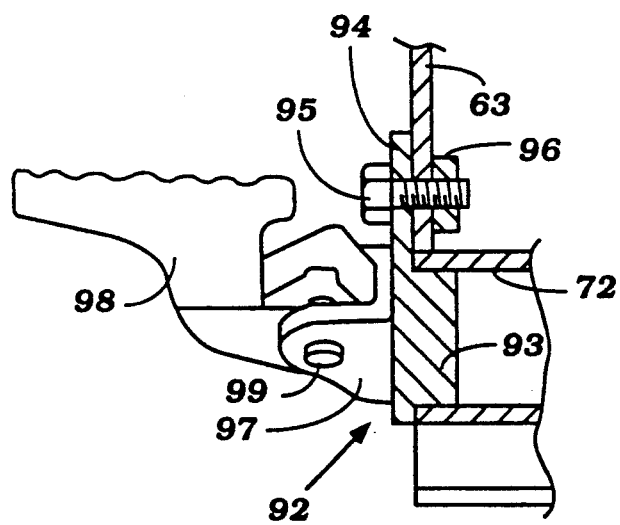
FIG. 13 is a cross sectional view taken along the line 13—13 of FIG. 9 and shows the arrangement for attaching the foot pegs.
Figure 14:
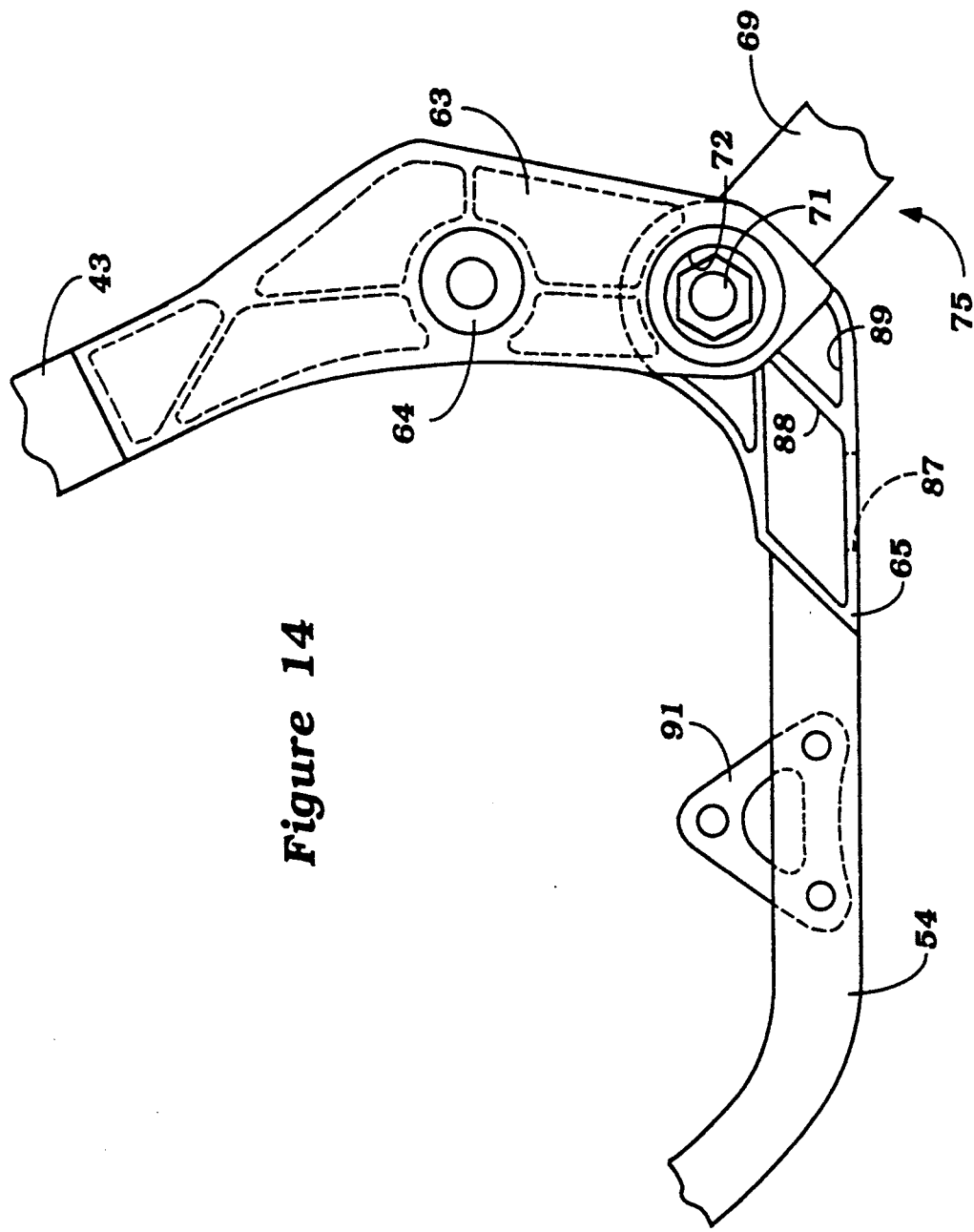
FIG. 14 is a side elevational view, in part similar to FIGS. 9 and 11, and shows further components of the frame assembly.
Figure 15:
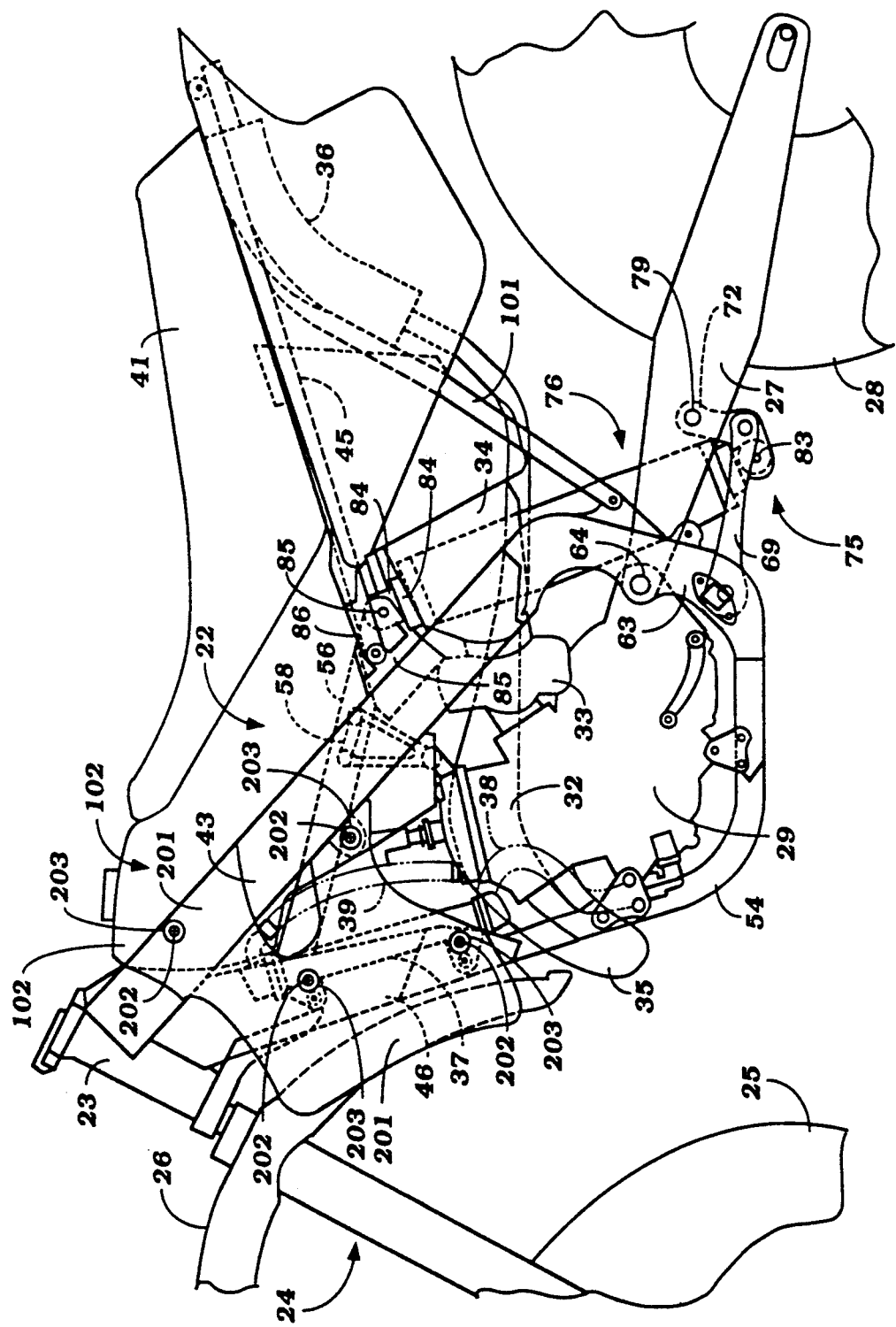
FIG. 15 is a partial side elevational view, in part similar to FIG. 1, but on a larger scale and showing a second embodiment of the invention.
Figure 16:
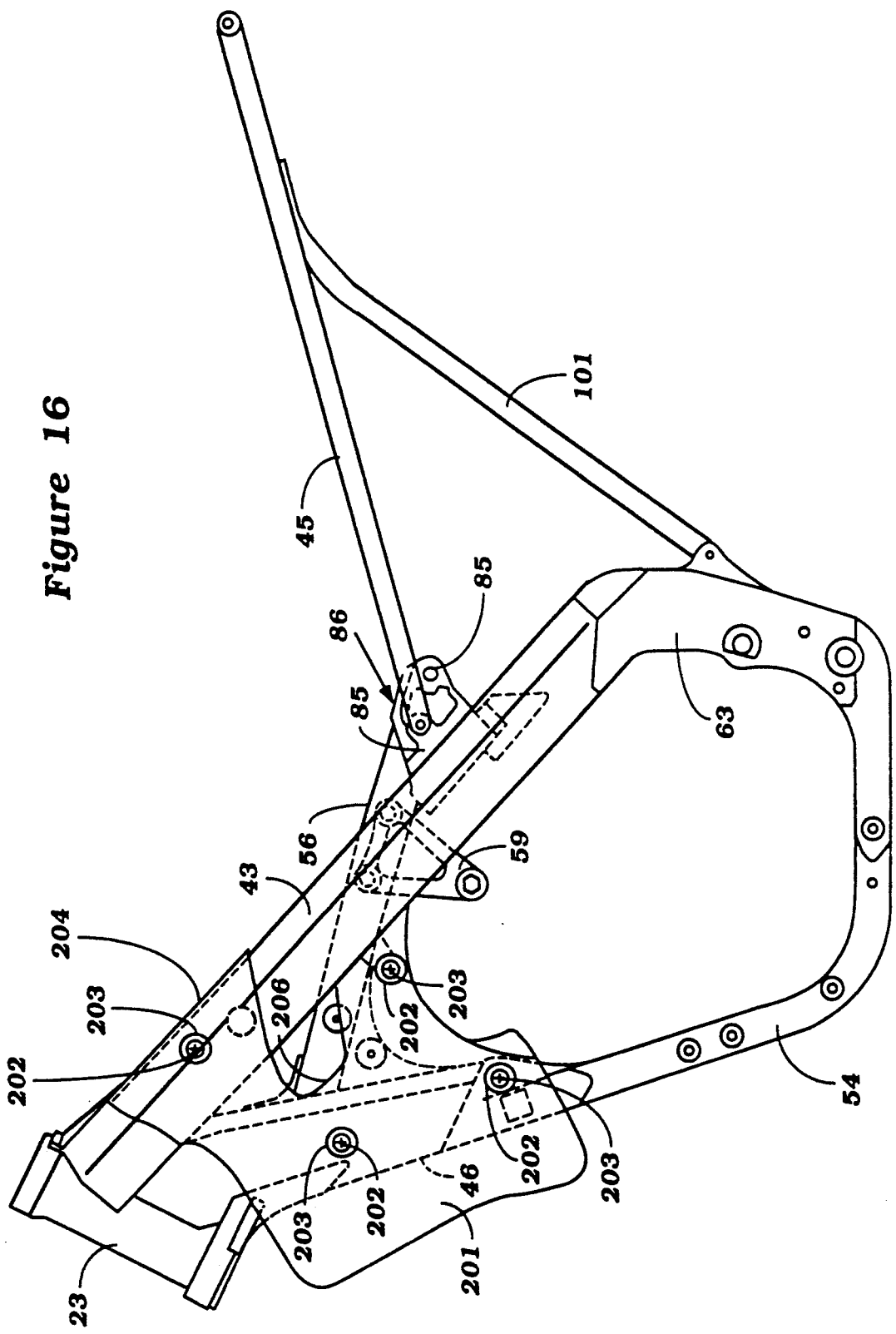
FIG. 16 is a side elevational view of the frame of this embodiment.
Figure 17:
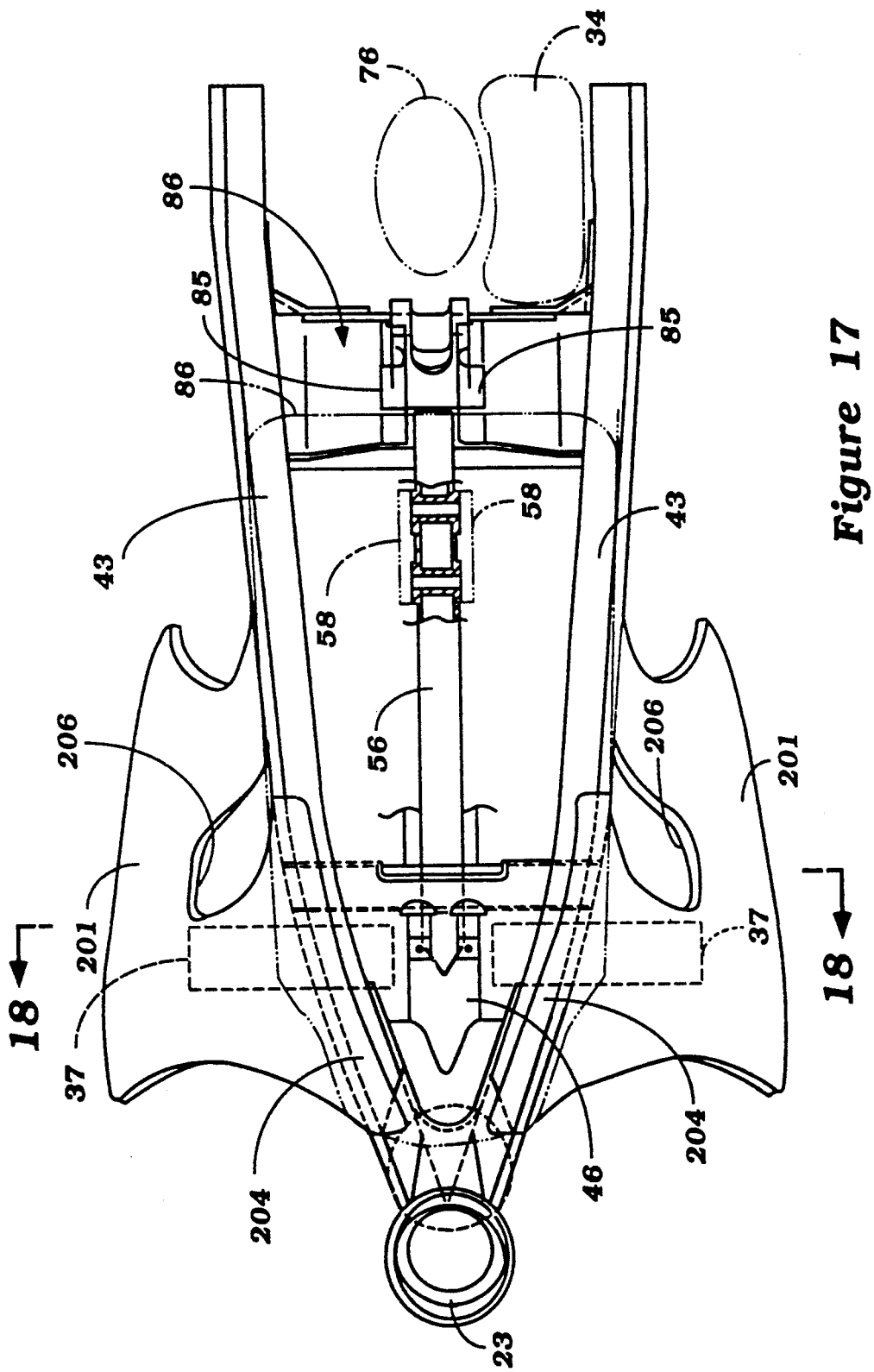
FIG. 17 is a top plan view showing primarily the frame construction of this embodiment of the invention.

Extrusion 65 is also adapted to mount a pair of foot peg assemblies, each indicated generally by the reference numeral 92. These foot peg assemblies 92 are shown in most detail in FIGS. 12 and 13 and include plug-like members 93 that extend into the openings 72 and close them. A flange 94 of the plug-like member 93 passes a bolt 95 which is held in place by a nut 96 to secure the plug-lixe member 93 into position. A trunion portion 97 pivotally supports a foot peg 98 on a pivot pin 99 for movement to an extended position as shown in FIG. 12 or a retracted position as shown in phantom in FIG. 9.

Referring again to FIG. 1 and solely to this figure, the seat rails 45 are supported by seat pillar rails 101 which are, in turn, affixed to the member 63 in an appropriate manner.

A fuel tank 102 is supported on the main frame member and generally extends down into the area between the main frame members and around the main frame member 56. The fuel tank 102 is provided with a filler neck that is accessible forwardly of the seat. In addition, deporting tank portions 103 may be employed to secure the fuel tank 102 to the center main frame member 56.

The radiators 37 are provided with radiator covers (not shown) which blend into the fuel tank 102 and seat 41 so as to provide a smooth overall configuration to the exterior of the motorcycle.

The construction as described in the proceeding paragraph may be best understood by reference to the second embodiment of the invention shown in FIGS. 15 through 18 which, except will hereandafter be noted, is the same as the proceeding embodiment. For that reason, components of this embodiment which are the same as those previously described have been identified by the same reference numerals as will not be described again. In this embodiment, it should be noted that the radiator side covers 201 are affixed to the main frame members 43 and radiators 37 by threaded fasteners 202 that extend through recesses 203 formed in the radiator covers 201. The radiator covers 201 have upper peripheral edges 204 that are complimentary to the side surfaces 205 of the fuel tank 102. The nesting portions 103 of the fuel tank 102 around the center main frame member 56 also appears clearly in FIG. 18.

Figure 18:
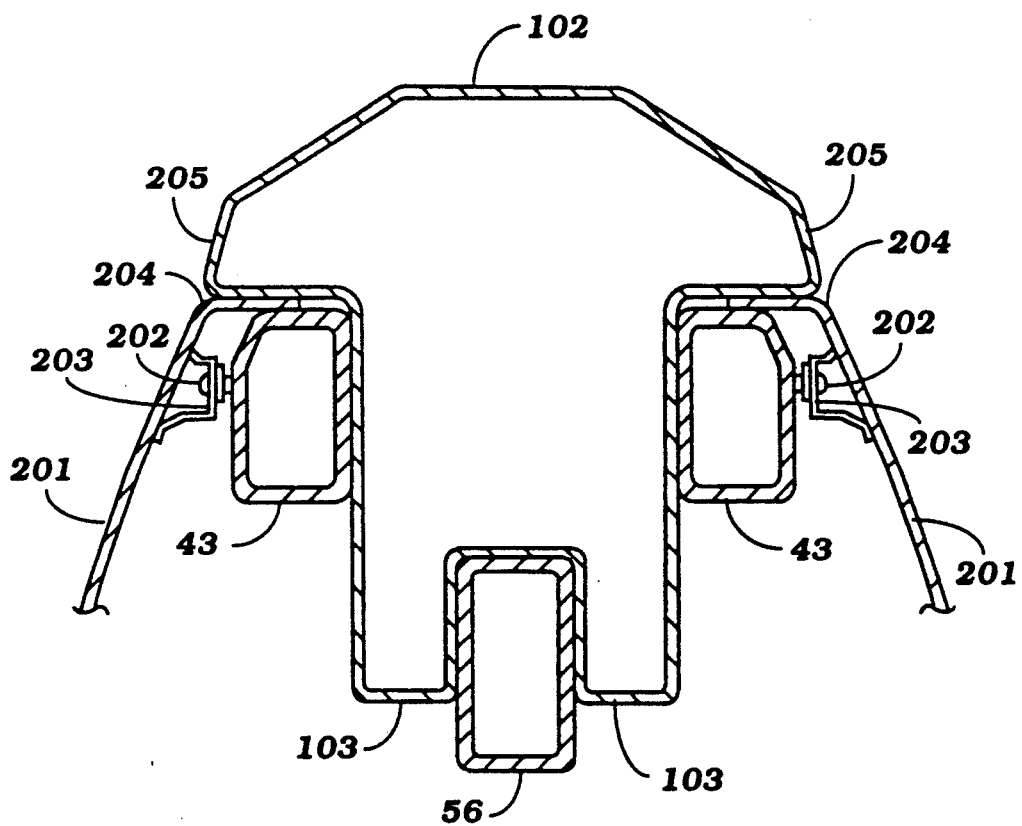
FIG. 18 is a cross sectional view taken along the line 18—18 of FIG. 17.

As may also been seen in FIG. 18, as is the case in the embodiment of FIGS. 1 through 14, the fuel tank 102 has its side portions 205 extending outwardly beyond the outer periphery of the pair of side main frame members 43. As a result, this provides a wider structure that provides a better riding position for the rider. The use of the center main frame member 56 dictates that the side main frame members 43 should be positioned close into the center of the motorcycle so as to improve the strength of the frame. If the fuel tank were no so widen, then a uncomfortable and unstable seating position would result.

The radiators covers 201 are provided with air relief openings 206 so that air which is passed across the radiators 37 may exit to the rear of the body without flow restriction to insure maximum cooling.

In this embodiment, the engine mount 59 is positioned rearwardly toward the pivot bolt 85 for the rear suspension element 76 and the cross member 62 is thus deleted. However, the cross member 86 is present in this embodiment so as to provide the rigidity for the frame structure and the interconnection between the center main frame 56 and the side main frame members 43. In this embodiment, the cross member 86 and pivot bolt 85 for the rear suspension element 76 are positioned forwardly of the rearward portion of the side frame members 43 relative to the previously described embodiment. That is, in this embodiment not only is the engine mount 59 move somewhat forwardly but also the center main frame member 56 is short in length than the previous described embodiment. As previously noted, in all other regards this embodiment is the same as those previously described and, for that reason, further description is not believed to be necessary.

Although two embodiments of the invention have been illustrated and described, each of which provides a very robust and yet lightweight frame construction, other forms of the invention are possible without departing from the spirit and scope of the invention, as defined by the appended claims.

I claim:

1. A frame construction for a motorcycle type of vehicle having a head pipe adapted to journal a front wheel for steering movement, a pair of main frame members affixed to said head pipe and extending downwardly and rearwardly there from to a pivot point for a rear wheel suspension, a center main frame member affixed to said head pipe and extending rearwardly therefrom at a different angle to the horizontal than said pair of main frame members, an engine mount directly affixed to said center main frame member for supporting an engine in a position generally below said center main frame member and said pair of main frame members, and cross member means affixing sad center main frame member and said pair of main frame members to each other rearwardly of said head pipe.

2. A frame construction for a motorcycle type of vehicle having a head pipe adapted to journal a front wheel for steering movement, a pair of main frame members affixed to said head pipe and extending downwardly and rearwardly therefrom to a pivot point for a rear wheel suspension, a center main frame member affixed to said head pipe and extending rearwardly therefrom at a different angle to the horizontal than said pair of main frame members, said center main frame member extending at a lesser angle to the horizontal than said pair of main frame members, an engine mount directly affixed to said center main frame member for supporting an engine, and cross member means affixing said main frame members to each other rearwardly of said head pipe.

3. A frame construction for a motorcycle type of vehicle as set forth in claim 2 wherein the pair of main frame members are affixed to one end of the head pipe and the center main frame member is affixed to the head pipe at a spaced location from the attachment of the pair of main frame members.

4. A frame construction for a motorcycle type of vehicle as set forth in claim 3 wherein the cross member means comprises a cross member affixed to the main frame members contiguous to a suspension pick-up point for the rear wheel.

5. A frame construction for a motorcycle type of vehicle as set forth in claim 4 wherein the engine mount is affixed to the center main frame member contiguous to the cross member.

6. A frame construction for a motorcycle type of vehicle as set forth in claim 4 wherein the engine mount is affixed to the center main frame member forwardly of the cross member.

7. A frame construction for a motorcycle type of vehicle as set forth in claim 4 wherein the suspension pick-up point is provided by the center main frame member.

8. A frame construction for a motorcycle type of vehicle as set forth in claim 7 wherein the suspension pick-up point is provided on the center main frame member at a point vertically above and to the rear of the pair of main frame members when viewed in side elevation.

9. A frame construction for a motorcycle type of vehicle as set forth in claim 1 wherein the pair of main frame members are affixed to one end of the head pipe and the center main frame member is affixed to the head pipe at a spaced location from the attachment of the pair of main frame members.

10. A frame construction for a motorcycle type of vehicle as set forth in claim 9 wherein the cross member means comprises a cross member affixed to the main frame members contiguous to a suspension pick-up point for the rear wheel.

11. A frame construction for a motorcycle type of vehicle as set forth in claim 10 wherein the engine mount is affixed to the center main frame member contiguous to the cross member.

12. A frame construction for a motorcycle type of vehicle as set forth in claim 10 wherein the engine mount is affixed to the center main frame member forwardly of the cross member.

13. A frame construction for a motorcycle type of vehicle as st forth in claim 10 wherein the suspension pick-up point is provided by the center main frame member.

14. A frame construction for a motorcycle type of vehicle as set forth in claim 13 wherein the suspension pick-up point is provided on the center main frame member at a point vertically above and to the rear of the pair of main frame members when viewed in side elevation.

15. A frame construction for a motorcycle type of vehicle having a head pipe adapted to journal a front wheel for steering movement, a pair of main frame members affixed to said head pipe and extending downwardly and rearwardly therefrom to a pivot point for a rear wheel suspension, a center main frame member affixed to said head pipe and extending rearwardly therefrom at a different angle to the horizontal than said pair of main frame members, an engine mount directly affixed to said center main frame member for supporting an engine in a position generally below said main frame members, cross member means affixing said center main frame and aids pair of main frame members to each other rearwardly of said head pipe, and down tube means affixed to said head pipe and extending downwardly and rearwardly therefrom beneath the engine and being affixed to said pair of main frame members adjacent a pivot point for a rear wheel suspension.

16. A frame construction for a motorcycle type of vehicle as set forth in claim 15 wherein the pivot point for the rear wheel suspension is formed by a member to which the down tube means and the pair of main frame members are directly attached.

17. A frame construction for a motorcycle type of vehicle as st forth in claim 15 wherein the pair of main frame members are affixed to one end of the head pipe and the center main frame member is affixed to the head pipe at a location below the attachment of the pair of main frame members to the head pipe.

18. A frame construction for a motorcycle type of vehicle as set forth in claim 17 wherein the cross member means comprises a cross member affixed to the main frame members contiguous to a suspension pick-up point for the rear wheel.

19. A frame construction for a motorcycle type of vehicle as set forth in claim 18 wherein the engine mount is affixed to the center main frame member contiguous to the cross member.

20. A frame construction for a motorcycle type of vehicle as set forth in claim 18 wherein the engine mount is affixed to the center main frame member forwardly of the cross member.

21. A frame construction for a motorcycle type of vehicle having a head pipe adapted to journal a front wheel for steering movement, a pair of main frame members affixed to said head pipe and extending downwardly and rearwardly therefrom to a pivot point for a rear wheel suspension, a center main frame member affixed to said head pipe and extending rearwardly therefrom at a different angle to the horizontal than said pair of main frame members, an engine mount directly affixed to said center main frame member for supporting an engine, and cross member means affixing said main frame members to each other rearwardly of said head pipe, down tube means affixed to said head pipe and extending downwardly and rearwardly therefrom and being affixed to said main frame members adjacent a pivot point for a rear wheel suspension, the pivot point for the rear wheel suspension being formed by a member to which the down tube means and the pair of main frame members are directly attached, and a suspension element loaded between said rear wheel and said rear end of the center main frame member.

22. A frame construction for a motorcycle type of vehicle as set forth in claim 21 wherein the suspension element is affixed to the rear end of the center main frame member at a point to the rear of and above the pair of side main frame members when viewed in side elevation.

23. A frame construction for a motorcycle type of vehicle as set forth in claim 22 wherein the center main frame member extends at a lesser angle to the horizontal then the pair of main frame members.

24. A frame construction for a motorcycle type of vehicle as set forth in claim 23 wherein the pair of main frame members are affixed to one end of the head pipe and the center main frame member is affixed to the head pipe at a location below the attachment of the pair of main frame members to the head pipe.

25. A frame construction for a motorcycle type of vehicle as set forth in claim 24 wherein the cross member means comprises a cross member affixed to the main frame members contiguous to a suspension pick-up point for the rear wheel.

26. A frame construction for a motorcycle type of vehicle as st forth in claim 25 wherein the engine mount is affixed to the center main frame member contiguous to the cross member.

27. A frame construction for a motorcycle type of vehicle as set forth in claim 25 wherein the engine mount is affixed to the center main frame member forwardly of the cross member.

28. A frame construction for a motorcycle type of vehicle having a head pipe adapted to journal a front wheel for steering movement, a pair of main frame members affixed to said head pipe and extending downwardly and rearwardly therefrom to a pivot point for a rear wheel suspension, a center main frame member affixed to said head pipe at a point below the attachment of the pair of main frame members to said head pipe and extending rearwardly therefrom at a different angle to the horizontal than said pair of main frame members, and cross member means affixing said main frame members to each other rearwardly of said head pipe.

29. A frame construction for a motorcycle type of vehicle as set forth in claim 28 wherein the cross member means comprises a cross member affixed to the main frame members contiguous to a suspension pick-up point for the rear wheel.

30. A frame construction for a motorcycle type of vehicle as set forth in claim 29 further including an engine mount affixed to the center main frame member contiguous to the cross member.

31. A frame construction for a motorcycle type of vehicle as set forth in claim 29 further including an engine mount affixed to the center main frame member forwardly of the cross member.

32. A frame construction for a motorcycle type of vehicle as set forth in claim 29 wherein the suspension pick-up point is provided by the center main frame member.

33. A frame construction for a motorcycle type of vehicle as set forth in claim 32 wherein the suspension pick-up point is provided on the center main frame member at a point vertically above and to the rear of the pair of main frame members when viewed in side elevation.

34. A frame construction for a motorcycle type of vehicle as set forth in claim 28 further including an engine mount affixed to the center main frame member contiguous to the cross member.

35. A frame construction for a motorcycle type of vehicle as set forth in claim 34 further including an engine mount affixed to the center main frame member forwardly of the cross member.

36. A frame construction for a motorcycle type of vehicle as set forth in claim 35 wherein the suspension pick-up point is provided by the center main frame member.

37. A frame construction for a motorcycle type of vehicle as set forth in claim 36 wherein the suspension element is affixed to the rear end of the center main frame member at a point to the rear of and above the pair of side main frame members when viewed in side elevation.

* * * * *